R. W. WIEDERWAX.
BURNER.
APPLICATION FILED AUG. 11, 1920.
1,405,242.
Patented Jan. 31, 1922.
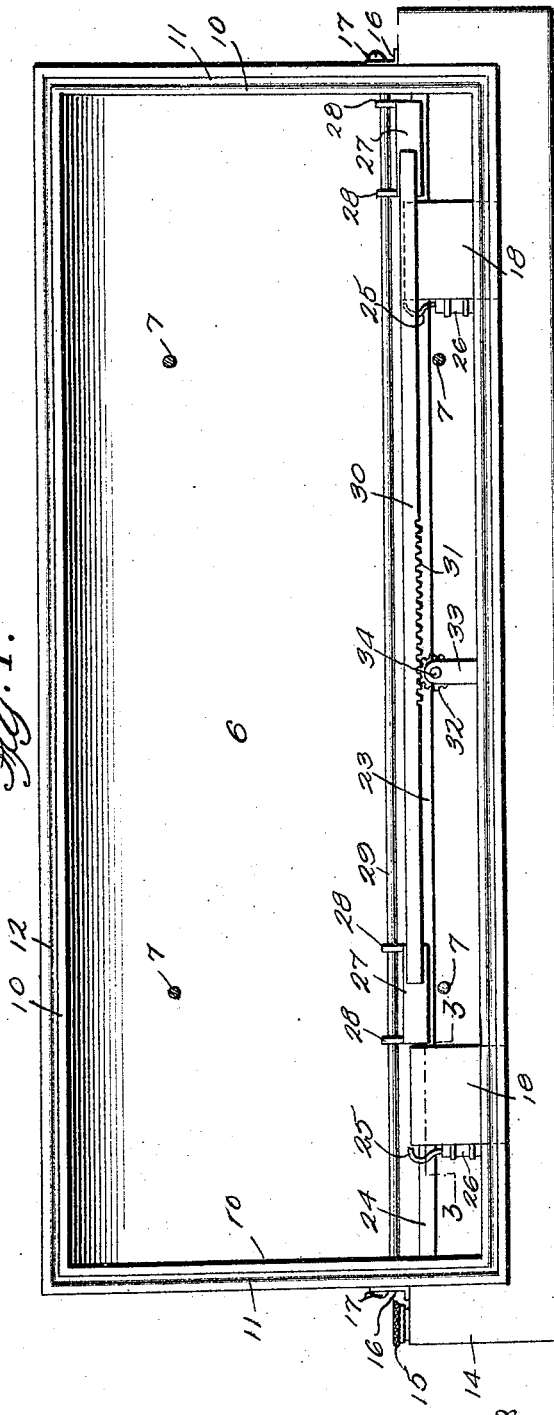
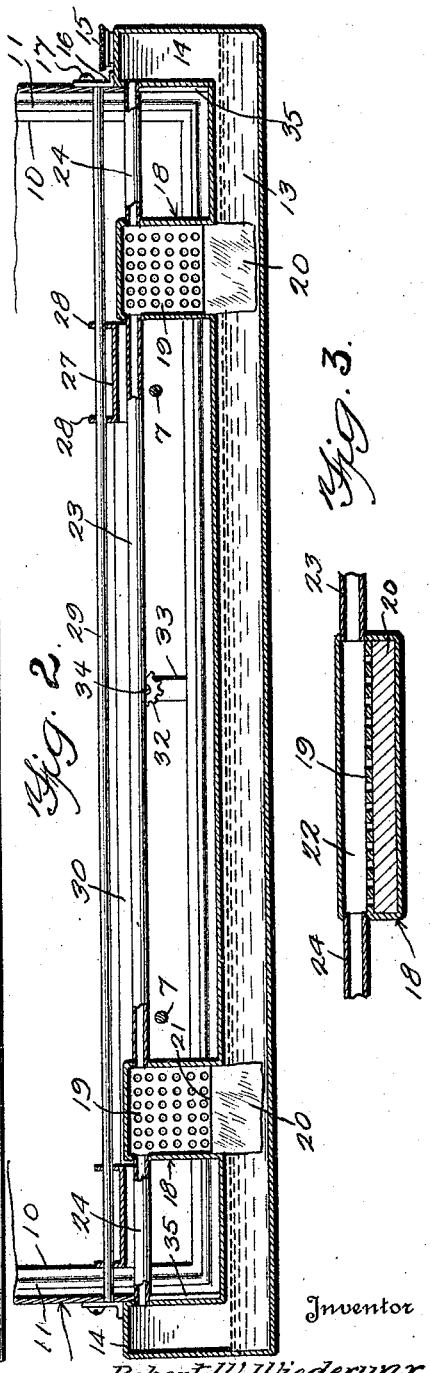
Inventor
Robert W. Wiederwax,

UNITED STATES PATENT OFFICE.

ROBERT W. WIEDERWAX, OF ATLANTIC CITY, NEW JERSEY, ASSIGNOR, BY DIRECT AND MESNE ASSIGNMENTS, TO GEIST MANUFACTURING COMPANY, OF ATLANTIC CITY, NEW JERSEY, A CORPORATION OF DELAWARE.

BURNER.

1,405,242.   Specification of Letters Patent.   Patented Jan. 31, 1922.

Application filed August 11, 1920. Serial No. 402,745.

*To all whom it may concern:*

Be it known that I, ROBERT W. WIEDERWAX, a citizen of the United States, residing at Atlantic City, in the county of Atlantic and State of New Jersey, have invented certain new and useful Improvements in Burners, of which the following is a specification.

This invention relates to burners, and it comprises a fuel tank or container, a burner or burners connected to said fuel tank, each of said burners including a plurality of passages, perforated walls separating said passages, a wick arranged in one of said passages, means connected to one of said passages for collecting vapors and returning them to the fuel container, igniting means for said burners and means for regulating said burners.

In the present invention, I have produced a device especially suitable for heating the circulating, cooling water of internal combustion engines to prevent freezing in cold weather.

The invention further comprises a novel type of burner including a plurality of passages separated from each other by perforated walls. The upper portion of the wick is arranged in one of said passages, the bottom of said passage being closed and the lower end of the wick passing through a slot or opening in the perforated wall and through the bottom of the other passage to the fuel tank. The second passage is employed for the collection of vapors produced by a vaporization of the fuel before it reaches the end of the wick, the vapors so collected being delivered to a pipe whence they are returned to the fuel tank and condensed. The provision of means for collecting vapors formed before the fuel reaches the end of the wick prevents overheating.

In the accompanying drawings, I have shown an advantageous embodiment of my invention. In this showing, Figure 1 is a view in elevation.

Figure 2 is a central vertical sectional view, and

Figure 3 is a horizontal sectional view on the line 3—3 of Figure 1.

Referring to the drawings, the burner comprises a housing or plate 6 adapted to be secured to the front of a radiator of a motor vehicle. The housing is closed on both ends, being open at the back to permit passage of heated products of combustion into the radiator proper and being open at the bottom for the reception of the fuel tank. It is maintained in position by a plurality of bolts 7 passing through a support the bolts being provided with suitable fastening means (not shown.) The housing is provided with a flange 10 (see Figures 1 and 2), extending around the four sides where the housing is secured to a support and this flange is provided with a groove 11 for the reception of suitable packing 12 to prevent leakage of products of combustion passing from the burners.

A fuel tank or container 13 is arranged beneath the open bottom of the housing, the ends of the tank being provided with extensions 14, extending upwardly as shown in Figures 1 and 2. One of these extensions is provided with a filling cap 15 which may be provided with a suitable vent or opening for escape of vapors. The fuel tank is provided with a plurality of clips 16 having openings for the reception of screws or other fastening elements 17 whereby it is secured to the housing. A plurality of burner casings 18 are connected to the fuel tank and extend upwardly into the housing. Any suitable number of burners may be employed in connection with a heater of this type. In the drawings, I have shown a pair of burners arranged near each end of the fuel tank, but any other arrangement may be employed. As shown, each of the burner casings comprises a plurality of passages separated from each other by perforated walls 19. A wick 20 is arranged in one of these passages, the upper end of the wick passage being open. The lower end of the wick passage is closed and the lower end of the wick is passed through a slot 21 in the perforated wall to the other passage which is provided with an opening at the bottom communicating with the fuel tank. The second passage 22 provides means for collecting any vapors formed by vaporization of the fuel before it reaches the tip of the wick. These passages of the burners are connected to each other by pipes 23 and to the extensions of the fuel tank by pipes 24 whereby the vaporized fuel may be returned to the tank. As the vapors enter the tank, they are condensed and may be used later as fuel. The provision of means for returning any vapors formed before the fuel reaches the top of the wick prevents overheating and permits moderate heating of the circulating water of a cooling system without injury to the heater or to the radiator tubes.

Each of the burners is provided with an igniter consisting of an electrode 25 mounted on a suitable insulating support 26. The end of the electrode is arranged near the tip of the burner and slightly spaced from the burner casing. The electrode is connected to a suitable source of electric energy, the other terminal of the electric circuit being grounded on the heater and furnishing a spark between the electrode 25 and the burner casing when the circuit is closed to ignite the burner. Each of the burners is provided with a regulator consisting of a substantially U-shaped member 27 having ears 28. These ears are provided with openings for the passage of a rod 29 on which the regulators are slidably mounted. The regulators are connected by a plate 30 having rack teeth 31 meshing with a gear or pinion 32 mounted in a suitable supporting bracket 33. The pinion is provided with an operating shaft 34 which may extend to any suitable point, such as the dash of the machine (not shown).

The ends of the housing are provided with slots 35 adapted to receive the pipes 24 through which excess vapor is returned to the fuel container.

In operation, the burners may be ignited at any time by energizing the circuit passing through the igniters 25 to produce a spark and light the wick. The burners may be regulated by moving the regulators 27 to cover or uncover any desired portion of the burner and thus regulate the size of the flame.

When the burners are lighted, there is a tendency of the fuel passing through the wick to vaporize before it reaches the top of the wick. This is overcome by the provision of the passage 22 separated from the wick passage by the perforated wall 19. Any vapors formed before the fuel reaches the tip of the wick are collected in passage 22 and returned to the fuel tank by pipes 23 and 24, where they are condensed. The arrangement of the lower end of the wick, extending through passage 22 and slot 21, prevents the fuel from splashing into the burner casing when the device is used on a motor vehicle, and the vehicle is traveling over rough roads.

Any type of liquid fuel may be employed, but I prefer the use of alcohol, which permits ignition by an electric spark and because of its greater efficiency as a heating medium.

It is to be understood that while I have described the preferred embodiment of my invention, various changes in the shape, size, and arrangement of parts may be resorted to without departing from the spirit of the invention or the scope of the subjoined claims.

Having thus described my invention, I claim:

1. A burner comprising a fuel tank, a burner casing arranged above the fuel tank, said burner casing comprising a plurality of passages, perforated walls separating said passages, one of said passages forming a wick chamber, said wick chamber being open at the top and the other passages being closed at the top, said wick chamber being closed at the bottom, and one of the other passages being open communicating with the fuel tank, the wall between said passage and said wick chamber being provided with a slot, and a wick arranged in said wick chamber passing through said slot and said opening into the fuel tank.

2. A burner comprising a fuel tank, a plurality of spaced burner casings arranged adjacent said fuel tank, means within each of said burner casings to collect vapors formed by premature vaporization of the fuel, and collecting means connected to said burner casings and to said fuel tank to return the vapors to the tank.

3. A burner comprising a fuel tank, a plurality of spaced burner casings arranged adjacent the fuel tank, each of said burner casings comprising a plurality of passages separated from each other by perforated walls, a wick arranged in one of said passages, the other passages serving to collect vapors formed by premature vaporization of the fuel, and vapor collecting means connecting said passages of the burner casings and connected to said fuel tank.

4. A burner comprising a fuel tank, a plurality of spaced burner casings arranged adjacent the fuel tank, means within each of said burner casings to collect vapors formed by premature vaporization of the fuel, and tubes connecting said burner casings and connected to said fuel tank to return said vapors to the fuel tank.

5. A burner comprising a fuel tank, a plurality of burner casings arranged adjacent the fuel tank, each of said burner casings comprising a plurality of passages, perforated walls separating said passages, a wick arranged in one of said passages, the other passages serving to collect vapors formed by premature vaporization of the fuel, and tubes connecting said passages and connected to said fuel tank to return said vapors to the fuel tank.

In testimony whereof I affix my signature.

ROBERT W. WIEDERWAX.